(12) United States Patent
Kamada

(10) Patent No.: US 9,012,540 B2
(45) Date of Patent: Apr. 21, 2015

(54) RUBBER COMPOSITION FOR TIRE TREAD AND PNEUMATIC TIRE

(75) Inventor: Shinsaku Kamada, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 385 days.

(21) Appl. No.: 13/473,809

(22) Filed: May 17, 2012

(65) Prior Publication Data

US 2012/0302664 A1 Nov. 29, 2012

(30) Foreign Application Priority Data

May 23, 2011 (JP) ................................. 2011-114984

(51) Int. Cl.
| | | |
|---|---|---|
| B60C 1/00 | (2006.01) | |
| C08K 3/04 | (2006.01) | |
| C08K 5/548 | (2006.01) | |
| C08L 9/06 | (2006.01) | |
| C08L 7/00 | (2006.01) | |
| C08L 15/00 | (2006.01) | |
| C08L 97/00 | (2006.01) | |

(52) U.S. Cl.
CPC .............. B60C 1/0016 (2013.01); C08L 97/005 (2013.01); C08K 3/04 (2013.01); C08L 7/00 (2013.01); C08K 5/548 (2013.01); C08L 9/06 (2013.01); C08L 15/00 (2013.01)

(58) Field of Classification Search
CPC ........ B60C 1/0016; C08K 5/548; C08K 3/04; C08L 9/06; C08L 15/00; C08L 7/00; C08L 97/0085; C08L 2310/00
USPC ........................................... 524/34, 492, 495
See application file for complete search history.

(56) References Cited

U.S. PATENT DOCUMENTS

| | | | |
|---|---|---|---|
| 6,057,397 A | 5/2000 | Takagishi et al. | |
| 2004/0254301 A1 | 12/2004 | Tsukimawashi et al. | |
| 2009/0099281 A1 | 4/2009 | Sakurai et al. | |
| 2010/0108213 A1* | 5/2010 | Miyazaki | 152/209.5 |

FOREIGN PATENT DOCUMENTS

| | | |
|---|---|---|
| CN | 1578790 A | 2/2005 |
| DE | 10 2008 050 966 A1 | 5/2009 |
| EP | 0 704 481 A1 | 4/1996 |
| EP | 0 806 452 A1 | 11/1997 |
| JP | 10-204216 A | 8/1998 |
| JP | 11-060816 A | 3/1999 |
| JP | 2008-308615 A | 12/2008 |
| JP | 2009-79077 A | 4/2009 |
| JP | 2009-108308 A | 5/2009 |
| JP | 2009-280807 A | 12/2009 |
| JP | 2010-242023 A | 10/2010 |
| WO | 96/23027 A1 | 8/1996 |
| WO | 03/029299 A1 | 4/2003 |

OTHER PUBLICATIONS

Carbon Black, Encyclopedia of Polymer Science and Technology, John Wiley & Sons, Inc., vol. 9, p. 67, published Oct. 15, 2003.*
Chinese Office Action dated Jan. 6, 2014, issued in corresponding Chinese Patent Application No. 201210159936 X with English Translation. (14 pages).
Japanese Office Action dated Jun. 24, 2014, issued in corresponding Japanese Patent Application No. 2011-114984 with English translation (7 pages).
German Office Action dated Dec. 4, 2013, in corresponding German Application No. 10 2012 010 112.0; w/ English Translation. (8 pages).

* cited by examiner

*Primary Examiner* — Angela C Scott
(74) *Attorney, Agent, or Firm* — Westerman, Hattori, Daniels & Adrian, LLP

(57) ABSTRACT

A rubber composition for a tire tread includes a modified diene rubber comprising a styrene butadiene rubber and/or a polybutadiene rubber, having a functional group such as an amino group or a hydroxyl group, silica, a silane coupling agent, a lignin derivative, and a carbon masterbatch. The carbon masterbatch comprises a styrene butadiene rubber, and carbon black having iodine adsorption of from 60 to 130 g/kg, and a ratio of the amount (B) of a rubber in the carbon masterbatch to the amount (A) of the modified diene rubber is B/A=0.25 to 1. The total amount of the carbon black and the silica is from 40 to 100 parts by mass per 100 parts by mass of a rubber component, the proportion of the silica in fillers is from 25 to 80% by mass, and the amount of the lignin derivative is from 0.1 to 10 parts by mass.

13 Claims, 1 Drawing Sheet

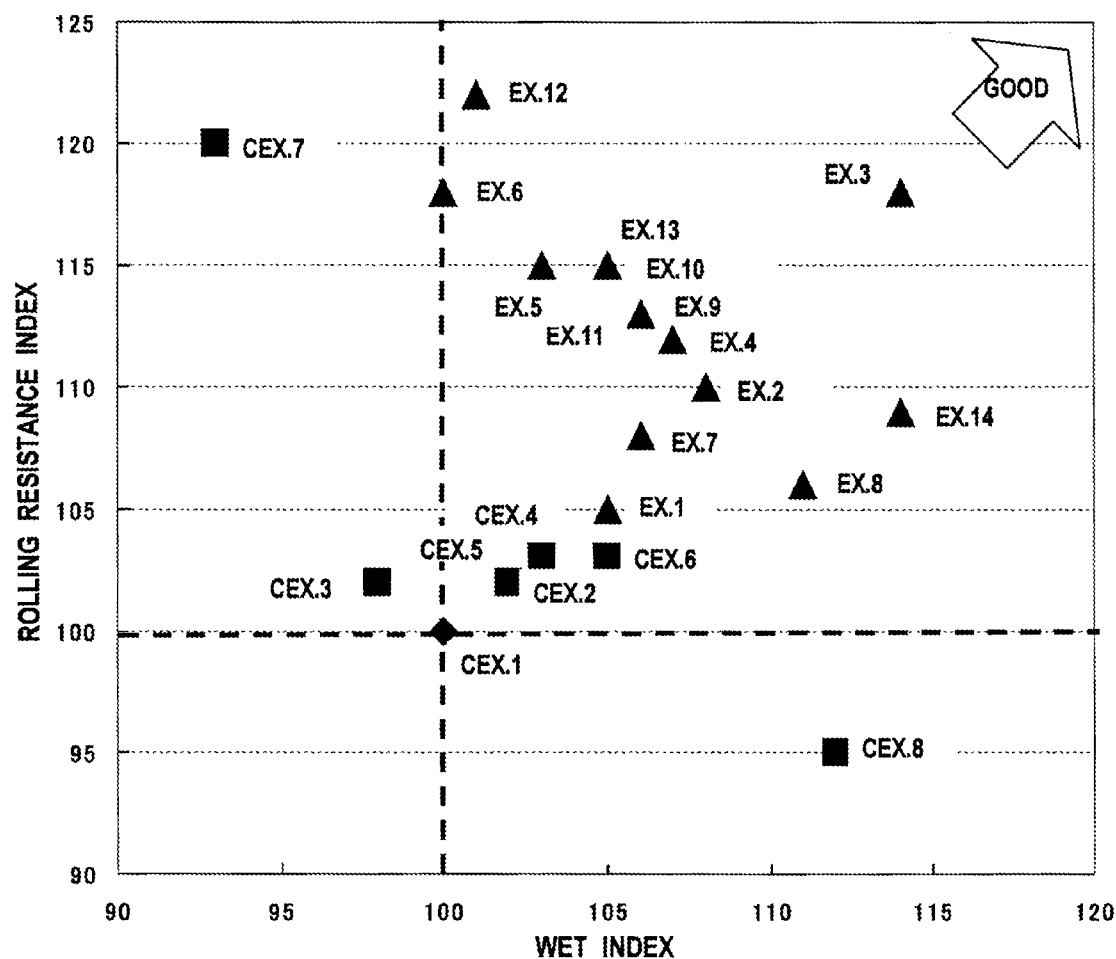

RUBBER COMPOSITION FOR TIRE TREAD AND PNEUMATIC TIRE

CROSS-REFERENCE TO RELATED APPLICATIONS

This application is based upon and claims the benefit of priority from the prior Japanese Patent Application No. 2011-114984, filed on May 23, 2011; the entire contents of which are incorporated herein by reference.

BACKGROUND

1. Technical Field

The disclosure relates to a rubber composition for a tire tread used in a tread of a pneumatic tire, and a pneumatic tire using the rubber composition.

2. Related Art

A pneumatic tire is required to improve rolling resistance performance contributing fuel efficiency, and wet performance that is grip performance on wet road surface. However, those performances generally have paradoxical relationship, and it is difficult to simultaneously satisfy two characteristics of rolling resistance performance and wet performance. To simultaneously satisfy those performances, silica is added as a filler. The silica is generally difficult to disperse in a rubber component. Therefore, a silane coupling agent is added to improve dispersibility of silica. However, the dispersibility is still insufficient, and it cannot be said that the characteristics of the silica are sufficiently exerted.

To improve dispersibility of silica, an attempt is made to, for example, increase mixing energy, change a structure and a particle diameter of silica, or use a modified rubber comprising a diene rubber having introduced therein a hydroxyl group, an amino group or the like (for example, see WO96/23027 and WO03/029299).

Furthermore, JP 2009-108308A discloses that a lignin derivative such as lignin sulfonate is added to a diene rubber in order to improve dispersibility of silica, thereby improving rolling resistance performance.

In those prior arts, a certain extent of effect is recognized in the improvement of rolling resistance performance and wet performance due to the improvement of dispersibility of silica, but it cannot be said that the effect is sufficient.

On the other hand, JP 11-60816A (1999) discloses a rubber composition for a tire tread, comprising, for the purpose of improving rolling resistance performance and wet performance, an oil extended rubber component A comprising a styrene butadiene rubber having high glass transition temperature; a carbon masterbatch comprising a mixture of a rubber component B comprising a styrene butadiene rubber having low glass transition temperature, and carbon black, the masterbatch having a Mooney viscosity higher than that of the oil extended rubber component A; and silica. JP 11-60816A describes that the oil extended rubber component A containing silica and the rubber component B containing carbon black are unevenly distributed in an appropriately heterogeneous state in the rubber composition, while having appropriate compatibility, respectively, thereby exerting characteristics of each rubber component. However, the silica cannot be dispersed well in the oil extended rubber component A by only the difference in Mooney viscosity, and improvement effects of rolling resistance performance and wet performance are insufficient.

SUMMARY

The rubber composition for a tire tread according to an embodiment comprises a modified diene rubber comprising a styrene butadiene rubber and/or a polybutadiene rubber, having at least one functional group selected from the group consisting of an amino group, a hydroxyl group, an epoxy group, an alkylsilyl group, an alkoxysilyl group and a carboxyl group; silica; a silane coupling agent; a lignin derivative; and a carbon masterbatch. The carbon masterbatch comprises a styrene butadiene rubber and carbon black having iodine absorption of from 60 to 130 g/kg. Ratio (B/A) of the amount (B) of the styrene butadiene rubber in the carbon masterbatch to the amount (A) of the modified diene rubber is from 0.25 to 1 in mass ratio. The total amount of the carbon black and the silica contained in the rubber composition is from 40 to 100 parts by mass per 100 parts by mass of a rubber component, and the proportion of the silica in the total amount of the carbon black and the silica is from 25 to 80% by mass. The amount of the lignin derivative is from 0.1 to 10 parts by mass per 100 parts by mass of the rubber component.

The pneumatic tire according to an embodiment comprises a tread comprising the rubber composition.

BRIEF DESCRIPTION OF THE DRAWING

FIG. 1 is a graph showing the relationship between rolling resistance performance and wet performance in Examples and Comparative Examples.

DETAILED DESCRIPTION

The rubber composition according to an embodiment comprises (a) a modified diene rubber having a functional group having reactivity or affinity with silica, (b) silica, (c) a silane coupling agent, (d) a lignin derivative, and (e) a carbon masterbatch. Use of the lignin derivative together with silica can improve dispersibility of the silica in the modified diene rubber, and can efficiently bond the silica and the modified diene rubber by an interaction between the functional group of the modified diene rubber and the silica. On the other hand, where other diene rubber is further blended with rubber composition comprising a modified diene rubber and a lignin derivative, carbon black is difficult to be dispersed in the other diene rubber, and reinforcing property may be deteriorated. On the other hand, the present embodiment uses a carbon masterbatch having previously dispersed therein carbon black. This embodiment can improve dispersibility of carbon black in the diene rubber to be blended with the modified diene rubber. Thus, the rubber composition according to the embodiment can improve dispersibility of silica and carbon black that are fillers, thereby the balance between rolling resistance performance and wet performance can remarkably be improved.

As the modified diene rubber (a), a styrene butadiene rubber (SBR) and/or a polybutadiene rubber (BR), having at least one functional group selected from the group consisting of an amino group, a hydroxyl group, an epoxy group, an alkylsilyl group, an alkoxysilyl group and a carboxyl group can be used. Those functional groups are known as having an interaction with a silanol group (Si—OH) of silica. The term "interaction" used herein means that chemical bonding by chemical reaction or hydrogen bonding occurs with silanol groups of silica. When the modified diene rubber having such a functional group is used in combination with the lignin derivative, the silica having improved dispersibility is efficiently bonded to the modified diene rubber by the interaction, and the balance between rolling resistance performance and wet performance can be improved.

In the functional group, the amino group is not limited to a primary amino group, but may be a secondary amino group.

The alkylsilyl group may be any of a monoalkylsilyl group, a dialkylsilyl group, and a trialkylsilyl group. The alkoxysilyl group means a group in which at least one of three hydrogens of a silyl group is substituted with an alkoxyl group (for example, a methoxy group, an ethoxy group, a propoxy group or butoxy group), and includes a trialkoxysilyl group, an alkyl dialkoxysilyl group and a dialkyl alkoxysilyl group. Those functional groups may be introduced in a polymer terminal of a styrene butadiene rubber or a polybutadiene rubber, or may be introduced in a polymer chain.

The modified diene rubber having such a functional group itself is known, and a production method thereof and the like are not limited. For example, the functional group may be introduced by modifying a styrene butadiene rubber or a polybutadiene rubber, which was synthesized by anionic polymerization, with a modifier, or may be introduced in a polymer chain by copolymerizing the monomer having the functional group with styrene or butadiene, which is a monomer constituting a base polymer. Specifically, a hydroxyl-modified diene rubber can be prepared by, for example, the method disclosed in WO96/23027. An amino-modified diene rubber can be prepared by, for example, the method disclosed in WO03/029299. A carboxyl-modified diene rubber can be prepared by, for example, the method disclosed in JP 5-255408A (1993).

The modified diene rubber is preferably a styrene butadiene rubber and/or a polybutadiene rubber, obtained by solution polymerization, and more preferably a solution polymerized styrene butadiene rubber (SSBR). In the modified SSBR, a styrene content (St) is not particularly limited, and is preferably from 10 to 45% by mass, and more preferably from 15 to 40% by mass. The modified SSBR has a glass transition temperature (Tg) of preferably from −50 to −10° C., and more preferably from −40 to −20° C. The styrene content used herein is a value calculated from an integral ratio of $^1$HNMR spectrum. The glass transition temperature used herein is a value measured in a temperature rising rate of 20° C./min (measuring temperature range: −150 to 50° C.) by a differential scanning calorimetry (DSC) method according to JIS K7121.

The silica (b) is not particularly limited, and includes wet silica (hydrous silicic acid), dry silica (anhydrous silicic acid), calcium silicate and aluminum silicate. Of those, wet silica is preferably used. Colloidal characteristics of the silica are not particularly limited. The silica has nitrogen adsorption specific surface area (BET) by BET method of preferably from 150 to 250 m$^2$/g, and more preferably from 180 to 230 m$^2$/g. BET of the silica is measured according to BET method described in ISO 5794.

The silane coupling agent (c) is not particularly limited, and various conventional silane coupling agents can be used. Examples of the silane coupling agent that can be used include sulfide silanes such as bis(3-triethoxysilylpropyl) tetra-sulfide, bis(3-triethoxysilylpropyl)disulfide or bis(2-triethoxysilylethyl)tetrasulfide; protected mercaptosilanes such as 3-octanoylthio-1-propyltriethoxysilane or 3-propionylthiopropyltrimethoxysilane.

The lignin derivative (d) improves dispersibility of silica, and lignin sulfonate are preferably used. The lignin sulfonate has a phenolic hydroxyl group originated from lignin, and a sulfonate group. Therefore, the lignin sulfonate can further improve dispersibility of silica. The lignin derivative may be obtained by a sulfite pulping method, or may be obtained by a kraft pulping method. The lignin sulfonate obtained by a sulfite pulping method is preferably used. Examples of the lignin sulfonate include alkali metal salts, alkaline earth metal salts, ammonium salts and alcohol amine salts of lignin sulfonic acid. Those can be used alone or as mixtures of two or more thereof. Preferred lignin sulfonate is alkali metal salts and/or alkaline earth metal salts of lignin sulfonic acid, and examples thereof include a potassium salt, a sodium salt, a calcium salt, a magnesium salt, a lithium salt, and a barium salt. Mixtures of those salts may be used.

The lignin sulfonate may contain saccharides such as monosaccharide or polysaccharide. Examples of the saccharides include cellulose of wood component, glucose which is a constituent unit of cellulose, and a polymer of glucose, for example, hexose, pentose, mannose, galactose, ribose, xylose, arabinose, lyxose, ribose, talose, altrose, allose, gulose, idose, starch, starch hydrolyzate, dextran, dextrin and hemicellulose. The content of saccharides in the lignin sulfonate is preferably from 0 to 50% by mass, and more preferably 40% by mass or less. The lignin sulfonate may be a product from which saccharides have been removed by purification.

As the carbon masterbatch (e), a mixture of a styrene butadiene rubber and carbon black having iodine adsorption of from 60 to 130 g/kg is used. Thus, use of the masterbatch obtained by previously mixing carbon black with the styrene butadiene rubber can improve dispersibility of carbon black. That is, in the case of using the modified diene rubber, particularly in the case that its functional group is an amino group having interaction to not only silica, but carbon black, when carbon black is directly added together with silica, the carbon black is difficult to be mixed with other diene rubber (styrene butadiene rubber) to be blended with the modified diene rubber, and has poor dispersibility. However, when the carbon black is previously contained in the masterbatch, the carbon black can uniformly be dispersed in the styrene butadiene rubber. On the other hand, the silica is effectively incorporated in the modified diene rubber by the lignin derivative and the functional group of the modified diene rubber, and is uniformly dispersed in the modified diene rubber. Thus, silica and carbon black that are fillers are uniformly dispersed in the respective rubber components. As a result, the balance between rolling resistance performance and wet performance can remarkably be improved.

As the styrene butadiene rubber used in the carbon masterbatch, a rubber (ESBR) obtained by emulsion polymerization is preferably used. In the ESBR, styrene content (St) is preferably larger than that in the modified diene rubber (a). Although not particularly limited, the styrene content is preferably from 15 to 45% by mass, and more preferably from 20 to 40% by mass. The glass transition temperature (Tg) of the styrene butadiene rubber is preferably lower than that of the modified diene rubber (a). Although not particularly limited, the glass transition temperature is preferably from −60 to −35° C., and more preferably from −55 to −40° C.

The carbon black used in the carbon masterbatch has iodine adsorption (IA) of from 60 to 130 g/kg. When the carbon black having iodine adsorption in this range is used, the balance between rolling resistance performance and wet skid performance can be improved. Where the iodine adsorption is too small, wet performance and wear resistance may be decreased. On the other hand, where the iodine adsorption is too large, rolling resistance performance may be decreased. The iodine adsorption is more preferably from 80 to 120 g/kg, and further preferably from 100 to 120 g/kg. The iodine adsorption of carbon black is measured according to ASTM D1510.

The amount of the carbon black in the carbon masterbatch is not particularly limited. The amount is preferably from 30 to 120 parts by mass, and more preferably from 90 to 100 parts by mass, per 100 parts by mass of the styrene butadiene rubber. The carbon masterbatch may contain an oil such as a process oil. The amount of the oil added is not particularly limited, and is preferably 100 parts by mass or less, and more preferably from 5 to 70 parts by mass, per 100 parts by mass of the styrene butadiene rubber.

The carbon masterbatch can be prepared by mixing the styrene butadiene rubber, carbon black, and if necessary, an oil. The mixing can be achieved using the conventional methods. For example, the mixing is preferably performed by using a mixing machine such as a Banbury mixer.

In the rubber composition of the present embodiment, the blending ratio of the modified diene rubber (a) and the styrene butadiene rubber in the carbon masterbatch (e), as a rubber component is set as follows. Ratio of the amount (B) of the styrene butadiene rubber in the carbon masterbatch to the amount (A) of the modified diene rubber is set B/A=0.25 to 1 in mass ratio. Where the ratio B/A is less than 0.25, the amount (B) of the styrene butadiene rubber blended as the carbon masterbatch is too small, and the effect of improving dispersibility of the carbon black is impaired. On the other hand, where the ratio B/A exceeds 1, the amount (A) of the modified diene rubber is small, and the effect of improving dispersibility of the silica is impaired. The ratio B/A is such that the lower limit is more preferably 0.3 or more, further preferably 0.4 or more, and particularly preferably 0.5 or more, and the upper limit is 0.9 or less.

In the rubber composition of the present embodiment, the rubber component comprises the modified diene rubber (a), and the styrene butadiene rubber contained in the carbon masterbatch (e). The rubber component may further comprise other diene rubber. The other diene rubber includes various diene rubbers generally used in a rubber composition for a tire tread, such as natural rubber (NR), an isoprene rubber (IR), a butadiene rubber (BR), a styrene butadiene rubber (SBR), a styrene-isoprene copolymer rubber, a butadiene-isoprene copolymer rubber, and a styrene-isoprene-butadiene copolymer rubber. Those rubbers can be used alone or as mixtures of two or more thereof. To well exert the effect of the present embodiment described above, the amount of those other diene rubbers added is preferably 30% by mass or less as the proportion in the rubber component (that is, 30 parts by mass or less in 100 parts by mass of the rubber component), and more preferably 20% by mass or less.

In the rubber composition of the present embodiment, the total amount of the carbon black and the silica (that is, the total of fillers) is preferably from 40 to 100 parts by mass per 100 parts by mass of the rubber component. Where the total amount of the fillers is less than 90 parts by mass, it is difficult to obtain reinforcing property as a rubber composition for a tire tread, and wear resistance is deteriorated. On the other hand, where the total amount of the fillers exceeds 100 parts by mass, it is difficult to obtain rolling resistance performance. The total amount of the fillers is preferably from 60 to 100 parts by mass, and more preferably from 70 to 100 parts by mass.

The proportion of the silica in the total amount of the fillers is preferably from 25 to 80% by mass. Where the proportion of the silica is less than 25% by mass, it is difficult to obtain the balance between rolling resistance performance and wet performance. Where the proportion of the silica exceeds 80 parts by mass, reinforcing property of the styrene butadiene rubber in the component (e) is impaired. The proportion of the silica is more preferably from 30 to 70% by mass, and further preferably from 40 to 60% by mass. Although not particularly limited, the amount of the silica is preferably from 20 to 70 parts by mass, and more preferably from 30 to 60 parts by mass, per 100 parts by mass of the rubber component.

In the rubber composition of the present embodiment, the carbon black may include carbon black directly mixed with the modified diene rubber (a) together with each of the components (b) to (d), in addition to carbon black present in the carbon masterbatch (e). To well exert the effect of the present embodiment, the amount of the carbon black contained in the carbon masterbatch is preferably 50% by mass or more, and more preferably from 50 to 90% by mass, based on the mass of the carbon black contained in the rubber composition.

In the rubber composition of the present embodiment, the amount of the silane coupling agent is not particularly limited, and is preferably from 2 to 25 parts by mass, and more preferably from 5 to 20 parts by mass, per 100 parts by mass of the silica. Where the amount of the silica coupling agent is too small, the effect of improving dispersibility of the silica may be deteriorated. On the other hand, where the amount of the silane coupling agent exceeds 25 parts by mass, further improvement of the effect is small, and such an amount is not economical.

In the rubber composition of the present embodiment, to effectively exert the effect of improving dispersibility of the silica, the amount of the lignin derivative is preferably from 0.1 to 10 parts by mass, and more preferably from 1 to 7 parts by mass, per 100 parts by mass of the rubber component.

In addition to the above-mentioned components, the rubber composition according to the present embodiment can further contain various additives generally used in a rubber composition for a tire tread, such as a softer, a plasticizer, an age resister, zinc flower, stearic acid, a vulcanizing agent and a vulcanization accelerator. The vulcanizing agent includes sulfur and sulfur-containing compounds. Although not particularly limited, the amount of vulcanizing agent is preferably from 0.1 to 10 parts by mass, and more preferably from 0.5 to 5 parts by mass, per 100 parts by mass of the rubber component. Also, the amount of the vulcanization accelerator is preferably from 0.1 to 7 parts by mass, and more preferably from 0.5 to 5 parts by mass, per 100 parts by mass of the rubber component.

The rubber composition according to the present embodiment is prepared by kneading necessary components according to the conventional method using a kneading machine for rubber, such as an ordinary Banbury mixer or a kneader. For example, in a first kneading stage, the silica (b), the silane coupling agent (c), the lignin derivative (d), the carbon masterbatch (e), and other additives excluding a vulcanizing agent and a vulcanization accelerator are added to and mixed with the modified diene rubber (a), and a vulcanizing agent and a vulcanization accelerator are then added to and mixed with the resulting mixture in a final mixing stage. Thus, a rubber composition can be prepared.

The rubber composition thus obtained is preferably used in a tread rubber constituting a grounding surface of a pneumatic tire. For example, a tread part can be formed by vulcanization molding the rubber composition at a temperature of from 140 to 200° C. according to the conventional methods. The tread part of a pneumatic tire comprises a two-layer structure of a cap rubber and a base rubber, or comprises an integrated single-layer structure of those. In the case of using the rubber composition in a rubber constituting a grounding surface as a preferred embodiment, when the tread part has a single-layer structure, the entire tread part preferably comprises the rubber composition, and when the tread part has a two-layer structure, the cap rubber preferably comprises the rubber composition.

According to the present embodiment, dispersibility of carbon black can be improved by using the carbon masterbatch, and additionally, dispersibility of silica can be improved by the combination of the lignin derivative and the modified diene rubber. As a result, the balance between rolling resistance performance and wet performance can be improved.

EXAMPLE

The present embodiment is described in more detail below by reference to Examples, but it should be understood that the embodiment is not construed as being limited thereto.

Rubber compositions for a tire tread were prepared according to the formulations (parts by mass) shown in Tables 1 and 2 below by the conventional method using Banbury mixer. In detail, at a first kneading stage, compounding ingredients excluding sulfur and a vulcanization accelerator were added to and kneaded with a rubber component. At a final mixing stage, sulfur and a vulcanization accelerator were added to and kneaded with the kneaded mixture obtained. Thus, each rubber composition was prepared. Each component in Tables 1 and 2 is as follows.

Unmodified SBR1: Unmodified ESBR (St: 37% by mass, Tg: −40° C.), 34 parts by mass oil extended rubber, SBR0122 manufactured by JSR Corporation CMB1: Carbon masterbatch, ESBR (St: 23.5% by mass, Tg: −53° C.)/carbon black (IA: 120 g/kg)/oil=100/52/10 (mass ratio), ISP4684 manufactured by ISP CMB2: Carbon masterbatch, ESBR (St: 23.5% by mass, Tg: −51° C.)/carbon black (IA: 118 g/kg)/oil=100/60/20 (mass ratio), Diapol S960 manufactured by Mitsubishi Chemical Corporation CMB3: Carbon masterbatch, ESBR (St: 23.5% by mass, Tg: −53° C.)/carbon black (IA: 90 g/kg)/oil=100/82.5/62.5 (mass ratio), ISP1848 manufactured by ISP CMB4: Carbon masterbatch, ESBR (St: 23.5% by mass, Tg: −53° C.)/carbon black (IA: 71 g/kg)/oil=100/52/10 (mass ratio), ISP1606L manufactured by ISP CMB5: Carbon masterbatch, ESBR (St: 23.5% by mass, Tg: −51° C.)/carbon black (IA: 36 g/kg)/oil=100/90/20 (mass ratio), Diapol S920 manufactured by Mitsubishi Chemical Corporation CMB6: Carbon masterbatch, ESBR (St: 23.5% by mass, Tg: −49° C.)/carbon black (IA: 145 g/kg)/oil=100/52/12 (mass ratio), Diapol S970 manufactured by Mitsubishi Chemical Corporation Unmodified SBR2: Unmodified ESBR (St: 23.5% by mass, Tg: −51° C.), SBR1502 manufactured by JSR Corporation Modified SSBR1: Amino-modified SSBR (St: 20% by mass, Tg: −35° C.), HPR350 manufactured by JSR Corporation Modified SSBR2: Hydroxyl-modified SSBR (St: 36% by mass, Tg: −35° C.), 37.5 parts by mass oil extended rubber, TUFDENE E580 manufactured by Asahi Kasei Corporation Modified SSBR3: Carboxyl-modified SSBR (St: 24% by mass, Tg: −26° C.), 37.5 parts by mass oil extended rubber, PBR4003 manufactured by LANXESS

NR: RSS#3

Carbon black: DIABLACK N339 manufactured by Mitsubishi Chemical Corporation

Silica: NIPSIL AQ (BET: 205 $m^2/g$) manufactured by Tosoh Silica Corporation

Oil: PROCESS NC140 manufactured by Japan Energy Corporation

Silane coupling agent: Bis(3-triethoxysilylpropyl)-disulfide, Si75 manufactured by Degussa Lignin derivative: Sodium lignin sulfonate, VANILEX N manufactured by Nippon Paper Chemicals Stearic acid: LUNAC S-20 manufactured by Kao Corporation Zinc flower: Zinc Flower Grade 1, manufactured by Mitsui Mining and Smelting Co., Ltd.

Age resister: ANTIGEN 6C manufactured by Sumitomo Chemical Co., Ltd.

Wax: OZOACE 0355 manufactured by Nippon Seiro Co., Ltd.

Vulcanization accelerator: SOCCINOL CZ manufactured by Sumitomo Chemical Co., Ltd.

Sulfur: Powdered Silica manufactured by Tsurumi Chemical Industry Co., Ltd.

In the Tables, regarding the amount of unmodified SBR1 and modified SSBR 2 and 3, the value in the parenthesis is an amount (parts by mass) of a rubber polymer portion in an oil extended rubber, and regarding the amount of CMB 1 to 6, the value in the parenthesis is an amount (parts by mass) of a rubber polymer portion in a carbon masterbatch.

Each rubber composition obtained was vulcanized at 160° C. for 20 minutes to prepare a test piece, and wet performance, rolling resistance performance and wear performance were evaluated. Each evaluation method is as follows.

Wet performance: Loss coefficient tan δ was measured at a frequency of 10 Hz, static strain of 10%, dynamic strain of ±1% and a temperature of 0° C. using a viscoelasticity testing machine manufactured by Toyo Seiki. The wet performance was indicated by an index setting the value of Comparative Example 1 to be 100. The tan δ is large and the wet performance is excellent, with increasing the index.

Rolling resistance performance: Loss coefficient tan δ was measured at a frequency of 10 Hz, static strain of 10%, dynamic strain of ±1% and a temperature of 60° C. using a viscoelasticity testing machine manufactured by Toyo Seiki. The rolling resistance performance was indicated by an index which is the ratio of the reciprocal of the measured value with the reciprocal of the value of Comparative Example 1 set to be 100 ((tan δ of Comparative Example 1)×100/(tan δ of each test piece)). The tan δ is small and the rolling resistance performance (that is, fuel efficiency) is excellent, with increasing the index.

Wear performance: Wear volume was measured at a load of 3 kg, a slip ratio of 20% and a temperature of 23° C. using Lambourn abrasion tester according to JIS K6264. The wear performance was indicated by an index which is the ratio of the reciprocal of the measured value with reciprocal of the value of Comparative Example 1 as 100 ((wear volume of Comparative Example 1)×100/(wear volume of each test piece)). The wear volume is small and the wear resistance is excellent, with increasing the index.

TABLE 1

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Unmodified SBR1 | 53.6 (40) | 53.6 (40) | | | | 53.6 (40) | | |

TABLE 1-continued

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| CMB1 (IA: 120) |  |  | 65 (40) | 65 (40) | 65 (40) |  |  |  |
| CMB2 (IA: 118) |  |  |  |  |  |  |  |  |
| CMB3 (IA: 90) |  |  |  |  |  |  |  |  |
| CMB4 (IA: 71) |  |  |  |  |  |  |  |  |
| CMB5 (IA: 36) |  |  |  |  |  |  | 84 (40) |  |
| CMB6 (IA: 145) |  |  |  |  |  |  |  | 66 (40) |
| Unmodified SBR2 | 50 | 50 | 50 | 50 |  |  |  |  |
| Modified SSBR1 |  |  |  |  | 50 | 50 | 50 | 50 |
| Modified SSBR2 |  |  |  |  |  |  |  |  |
| Modified SSBR3 |  |  |  |  |  |  |  |  |
| NR | 10 | 10 | 10 | 10 | 10 | 10 | 10 | 10 |
| Carbon black | 40 | 40 | 19 | 19 | 19 | 40 | 4 | 19 |
| Silica | 45 | 45 | 45 | 45 | 45 | 45 | 45 | 45 |
| Oil | 26.4 | 26.4 | 36 | 36 | 36 | 26.4 | 32 | 35 |
| Silane coupling agent | 4 | 4 | 4 | 4 | 4 | 4 | 4 | 4 |
| Lignin derivative |  | 5 |  | 5 |  | 5 | 5 | 5 |
| Stearic acid | 2 | 2 | 2 | 2 | 2 | 2 | 2 | 2 |
| Zinc flower | 2 | 2 | 2 | 2 | 2 | 2 | 2 | 2 |
| Age resister | 2 | 2 | 2 | 2 | 2 | 2 | 2 | 2 |
| Wax | 2 | 2 | 2 | 2 | 2 | 2 | 2 | 2 |
| Vulcanization accelerator | 1.5 | 1.5 | 1.5 | 1.5 | 1.5 | 1.5 | 1.5 | 1.5 |
| Sulfur | 2.1 | 2.1 | 2.1 | 2.1 | 2.1 | 2.1 | 2.1 | 2.1 |
| Total amount of fillers | 85 | 85 | 85 | 85 | 85 | 85 | 85 | 85 |
| Total amount of oil | 40 | 40 | 40 | 40 | 40 | 40 | 40 | 40 |
| Wet performance | 100 | 102 | 98 | 103 | 103 | 105 | 93 | 112 |
| Rolling resistance performance | 100 | 102 | 102 | 103 | 103 | 103 | 120 | 95 |
| Wear performance | 100 | 102 | 102 | 103 | 104 | 104 | 91 | 110 |

TABLE 2

|  | Example 1 | Example 2 | Example 3 | Example 4 | Example 5 | Example 6 | Example 7 | Example 8 | Example 9 | Example 10 | Example 11 | Example 12 | Example 13 | Example 14 |
|---|---|---|---|---|---|---|---|---|---|---|---|---|---|---|
| Unmodified SBR1 |  |  |  |  |  |  |  |  |  |  |  |  |  |  |
| CMB1 (IA: 120) | 65 (40) | 65 (40) | 65 (40) |  |  |  | 65 (40) | 65 (40) | 49 (30) | 32 (20) | 65 (40) | 65 (40) | 65 (40) | 65 (40) |
| CMB2 (IA: 118) |  |  |  | 72 (40) |  |  |  |  |  |  |  |  |  |  |
| CMB3 (IA: 90) |  |  |  |  | 98 (40) |  |  |  |  |  |  |  |  |  |
| CMB4 (IA: 71) |  |  |  |  |  | 65 (40) |  |  |  |  |  |  |  |  |
| CMB5 (IA: 36) |  |  |  |  |  |  |  |  |  |  |  |  |  |  |
| CMB6 (IA: 145) |  |  |  |  |  |  |  |  |  |  |  |  |  |  |
| Unmodified SBR2 |  |  |  |  |  |  |  |  |  |  |  |  |  |  |
| Modified SSBR1 | 50 | 50 | 50 | 50 | 50 | 50 |  |  | 60 | 70 | 50 | 50 | 50 | 50 |
| Modified SSBR2 |  |  |  |  |  |  | 69 (50) |  |  |  |  |  |  |  |
| Modified SSBR3 |  |  |  |  |  |  |  | 69 (50) |  |  |  |  |  |  |
| NR | 10 | 10 | 10 | 10 | 10 | 10 | 10 | 10 | 10 | 10 | 10 | 10 | 10 | 10 |
| Carbon black | 19 | 19 | 19 | 16 | 7 | 19 | 19 | 19 | 24 | 30 | 19 | 19 | 39 |  |
| Silica | 45 | 45 | 45 | 45 | 45 | 45 | 45 | 45 | 45 | 45 | 25 | 25 | 25 | 64 |
| Oil | 36 | 36 | 36 | 32 | 15 | 36 | 17 | 17 | 37 | 38 | 22 | 6 | 36 | 36 |
| Silane coupling agent | 4 | 4 | 4 | 4 | 4 | 4 | 4 | 4 | 4 | 4 | 2 | 2 | 2 | 5 |

TABLE 2-continued

| | Example 1 | Example 2 | Example 3 | Example 4 | Example 5 | Example 6 | Example 7 | Example 8 | Example 9 | Example 10 | Example 11 | Example 12 | Example 13 | Example 14 |
|---|---|---|---|---|---|---|---|---|---|---|---|---|---|---|
| Lignin derivative | 0.5 | 5 | 10 | 5 | 5 | 5 | 5 | 5 | 5 | 5 | 5 | 5 | 5 | 5 |
| Stearic acid | 2 | 2 | 2 | 2 | 2 | 2 | 2 | 2 | 2 | 2 | 2 | 2 | 2 | 2 |
| Zinc flower | 2 | 2 | 2 | 2 | 2 | 2 | 2 | 2 | 2 | 2 | 2 | 2 | 2 | 2 |
| Age resister | 2 | 2 | 2 | 2 | 2 | 2 | 2 | 2 | 2 | 2 | 2 | 2 | 2 | 2 |
| Wax | 2 | 2 | 2 | 2 | 2 | 2 | 2 | 2 | 2 | 2 | 2 | 2 | 2 | 2 |
| Vulcanization accelerator | 1.5 | 1.5 | 1.5 | 1.5 | 1.5 | 1.5 | 1.5 | 1.5 | 1.5 | 1.5 | 1.5 | 1.5 | 1.5 | 1.5 |
| Sulfur | 2.1 | 2.1 | 2.1 | 2.1 | 2.1 | 2.1 | 2.1 | 2.1 | 2.1 | 2.1 | 2.1 | 2.1 | 2.1 | 2.1 |
| Total amount of fillers | 85 | 85 | 85 | 85 | 85 | 85 | 85 | 85 | 85 | 85 | 65 | 46 | 85 | 85 |
| Total amount of oil | 40 | 40 | 40 | 40 | 40 | 40 | 40 | 40 | 40 | 40 | 40 | 40 | 40 | 40 |
| Wet performance | 105 | 108 | 114 | 107 | 103 | 100 | 106 | 111 | 106 | 105 | 106 | 101 | 105 | 114 |
| Rolling resistance performance | 105 | 110 | 118 | 112 | 115 | 118 | 108 | 106 | 113 | 115 | 113 | 122 | 115 | 109 |
| Wear performance | 105 | 108 | 113 | 105 | 102 | 96 | 110 | 105 | 105 | 104 | 114 | 121 | 111 | 98 |

The results obtained are shown in Tables 1 and 2. As compared with Comparative Example 1 which is a control, Comparative Example 2 in which only a lignin derivative was added and Comparative Example 3 in which a carbon masterbatch was merely used were that the effect of improving wet performance and rolling resistance performance was insufficient. Comparative Example 4 using a carbon masterbatch together with a lignin derivative does not use modified SSBR. Therefore, even though dispersibility of silica is improved by the lignin derivative, unmodified SBR does not interact with silica. Therefore, the effect of improving wet performance and rolling resistance performance was insufficient in Comparative Example 4. In Comparative Example 5 using a carbon masterbatch together with modified SSBR and Comparative Example 6 using modified SSBR together with a lignin derivative, the effect of improving wet performance and rolling resistance performance was insufficient, similar to Comparative Example 4.

On the other hand, in Examples 1 to 8 using a carbon masterbatch together with modified SSBR and a lignin derivative, wet performance and rolling resistance performance were greatly improved without deterioration of wear resistance. Wet performance in Example 6 was equivalent to that of Comparative Example 1. However, in Example 6, rolling resistance performance is remarkably improved, and as a result, the balance between wet performance and rolling resistance performance is excellent. In Examples 9 and 10 in which a ratio between modified SSBR and SBR to be formed into a masterbatch was changed, and in Examples 11 and 12 in which the total amount of fillers was decreased, the balance between wet performance and rolling resistance performance was also greatly improved. In Example 13 in which the amount of silica was set to 29.4% by mass near the lower limit and Example 14 in which the amount of silica was set to 75.3% by mass near the upper limit, the balance between wet performance and rolling resistance performance was greatly improved.

On the other hand, in Comparative Example 7 in which the iodine adsorption of carbon black in the carbon masterbatch is too small, rolling resistance performance was excellent, but wet performance was greatly deteriorated, and wear resistance was poor. In Comparative Example 8 in which the iodine adsorption of carbon black in the carbon masterbatch is too large, wet performance was excellent, but rolling resistance performance was greatly deteriorated, and the balance between wet performance and rolling resistance performance was poor.

FIG. 1 is a graph showing the relationship between rolling resistance performance and wet performance in Examples and Comparative Examples, and means that the balance between those performances is excellent as shifting to a right upper side in the graph. As shown in the graph, Comparative Examples 1 to 8 (CEX. 1-8) had the paradoxical relationship that when one of rolling resistance performance and wet performance is improved, the other performance is deteriorated. However, Examples 1 to 14 (EX. 1-14) overcame the relationship, and showed the tendency that both performances are improved. Thus, remarkable effect was recognized in Examples 1 to 14.

The rubber composition according to the present embodiment can preferably be used in a tread of a pneumatic tire.

What is claimed is:

1. A rubber composition for a tire tread comprising:
   a modified diene rubber comprising a styrene butadiene rubber and/or a polybutadiene rubber, having at least one functional group selected from the group consisting of an amino group, a hydroxyl group, an epoxy group, an alkylsilyl group, an alkoxysilyl group and a carboxyl group;
   silica;
   a silane coupling agent;
   a lignin derivative; and
   a carbon masterbatch;
   wherein the carbon masterbatch comprises a styrene butadiene rubber and carbon black having iodine absorption of from 60 to 130 g/kg;
   ratio (B/A) of the amount (B) of the styrene butadiene rubber in the carbon masterbatch to the amount (A) of the modified diene rubber is from 0.25 to 1 in mass ratio;
   the total amount of the carbon black and the silica contained in the rubber composition is from 40 to 100 parts by mass per 100 parts by mass of a rubber component, and the proportion of the silica in the total amount of the carbon black and the silica is from 25 to 80% by mass; and
   the amount of the lignin derivative is from 0.1 to 10 parts by mass per 100 parts by mass of the rubber component.

2. The rubber composition for a tire tread according to claim 1, wherein the amount of the carbon black contained in the carbon masterbatch is 50% by mass or more of the amount of the carbon black contained in the rubber composition.

3. The rubber composition for a tire tread according to claim 1, wherein the lignin derivative is lignin sulfonate.

4. The rubber composition for a tire tread according to claim 1, wherein the amount of the silane coupling agent is from 2 to 25 parts by mass per 100 parts by mass of the silica.

5. The rubber composition for a tire tread according to claim 1, wherein the modified diene rubber is a modified solution polymerized styrene butadiene rubber, and the styrene butadiene rubber in the carbon masterbatch is an emulsion polymerized styrene butadiene rubber.

6. The rubber composition for a tire tread according to claim 5, wherein a glass transition temperature (Tg) of the styrene butadiene rubber in the carbon masterbatch is lower than that of the modified diene rubber.

7. The rubber composition for a tire tread according to claim 5, wherein a styrene content in the styrene butadiene rubber in the carbon masterbatch is larger than a styrene content in the modified diene rubber.

8. The rubber composition for a tire tread according to claim 1, wherein the amount of the lignin derivative is from 1 to 10 parts by mass per 100 parts by mass of the rubber component.

9. The rubber composition for a tire tread according to claim 1, wherein the ratio B/A is from 0.25 to 0.9.

10. The rubber composition for a tire tread according to claim 1, wherein the modified diene rubber is a modified styrene butadiene rubber having a hydroxyl group.

11. The rubber composition for a tire tread according to claim 1, wherein the modified diene rubber is a modified styrene butadiene rubber having a carboxyl group.

12. A pneumatic tire comprising a tread comprising the rubber composition according to claim 1.

13. A pneumatic tire comprising a tread rubber which constitutes a grounding surface of a pneumatic tire and comprises the rubber composition according to claim 1.

* * * * *